April 15, 1947.

F. DITCHFIELD

Re. 22,868

CAR CONSTRUCTION

Original Filed Oct. 21, 1943

~INVENTOR~
FRANK DITCHFIELD
BY~ Samuel Reese
~ATT'Y.~

Reissued Apr. 15, 1947

Re. 22,868

UNITED STATES PATENT OFFICE 22,868

CAR CONSTRUCTION

Frank Ditchfield, Cleveland, Ohio, assignor to The Youngstown Steel Door Company, Cleveland, Ohio, a corporation of Ohio Original No. 2,385,062, dated September 18, 1945, Serial No. 507,125, October 21, 1943. Application for reissue April 26, 1946, Serial No. 665,051

12 Claims. (Cl. 105—418)

This invention relates to car construction and is concerned primarily with the securement of greater strength of side sills for railway house cars, particularly at the door openings in such cars.

The standard AAR construction for railway house car embodies an angle side sill having unequal legs. The larger of the legs is arranged vertically and provides means to which the car side posts and the metallic sheathing are secured. This leg extends above the floor of the car so that it is necessary to cut off the projecting portion in the door opening formed in the side wall of the cars. This operation reduces the section of the side sill and thereby impairs its strength. Many side sills of this character have been found which in service had developed cracks beginning in the corners formed by the removal of the indicated portions of the vertical leg.

It is an object of this invention to provide a construction for railway house cars embodying a side sill having an upstanding leg wherein said leg is maintained intact so that substantially the full section of said sill is obtained in the door opening formed in the side wall of such cars.

A further object is to provide a construction which shall utilize the standard AAR angle side sill but which shall eliminate coping of the vertical leg thereof and maintain substantially the full section of said angle throughout its entire length.

A further object is to provide a novel side sill for railway house cars.

A further object is to provide a novel side sill for railway house cars which shall substantially overcome the tendency of cracking of the AAR side sill.

A further object is to provide a novel side sill of the character indicated which shall serve as a threshold plate.

Other objects of the invention will become clear as the description thereof proceeds.

In the drawing forming part of this specification:

Figure 1:
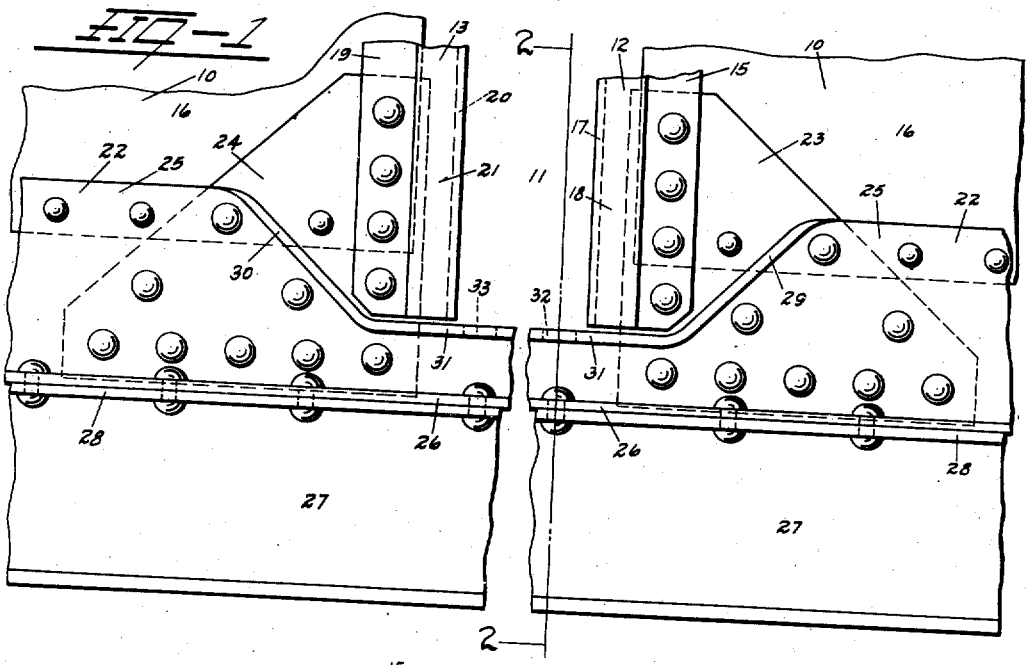
Fig. 1 is a fragmentary elevation, with parts broken away, of a railway house car provided with a side sill embodying the instant invention as viewed from the inside of the car, the floor being omitted.

Referring to the drawing, there is disclosed a portion of a side wall construction of a railway house car 10. A door opening 11 formed in the side wall of the car is defined in part by means of front and rear door posts 12 and 13 and a floor 14. The door posts are of the well known AAR type and are generally channel-shaped in section. The front door post 12 embodies a longer leg 15 to which metallic sheathing 16 is fastened, a web 17 and a shorter and inwardly disposed leg 18. Similarly, the rear door post 13 embodies a longer leg 19 to which the metallic sheathing 16 is secured, a web 20 and an inwardly disposed shorter leg 21.

The front and rear door posts 12 and 13 are secured to a side sill 22 which embodies the instant invention. The securement of the door posts to the side sill may be had in any desired manner, the securement illustrated being by means of gusset plates 23 and 24 disposed between the metallic sheathing 16 and the longer legs 15 and 19 of the door posts and preferably riveted to the sheathing and to the said legs of the door posts and to the upstanding leg 25 of the side sill 22.

Figure 2:
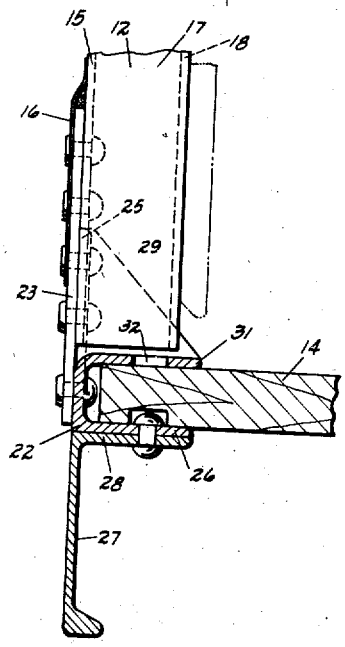
Fig. 2 is a vertical section taken on line 2—2 of Fig. 1, the floor being included.

The side sill 22 is preferably, though not necessarily, formed by means of an angle member which embodies the upstanding leg 25 and the inwardly directed horizontal leg 26. The securement of a sill reinforcing member 27 to the side sill 22 is customarily obtained by means of riveting the horizontal leg 28 of the reinforcing member to the horizontal leg 26 of the side sill. Adjacent to each of the door posts the upstanding leg 25 of the side sill is turned downwardly and inwardly to form similar sloping flanges 29 and 30 which, as more clearly shown in Fig. 2 of the drawing, progressively increase in width from the top of the vertical leg to points above the horizontal leg 26 of the sill. Between these points the upstanding leg 25 of the side sill provides a horizontal flange 31 integral with the sloping flanges 29 and 30 and of substantially uniform width. The portion of the upstanding leg of the side sill below the horizontal flange 31 extends substantially to the top of the floor 14 whereby the horizontal flange 31 serves as a threshold plate for the floor. The flange 31 is formed with a plurality of openings 32 and 33 which serve to permit riveting of the horizontal legs 26 and 28 of the side sill and side sill reinforcement.

It will be apparent from the foregoing that in the illustrated and preferred embodiment of the invention the entire section of the side sill is maintained and its strength preserved, particularly through the door opening.

It will be apparent that numerous changes and modifications in the details of the invention will be clear to those skilled in the art. It is intended, therefore, that all such modifications and changes be comprehended within this invention, which is to be limited only by the scope of the claims appended hereto.

I claim:

1. In a railway house car having a floor, spaced door posts, a side sill, said sill having an upstanding leg extending substantially from end to end of said car, said leg from said posts to the ends of said car extending above said floor, said leg being flanged between points adjacent to said posts, said flange gradually sloping downward and inward from said points to said posts and being horizontal from post to post, said horizontal portion of said flange being adapted to lie upon said floor, and means securing said posts to said sill.

2. In a railway house car having a floor, spaced door posts, a side sill, said sill having an upstanding leg extending substantially from end to end of said car, said leg from said posts to the ends of said car extending above said floor, said leg being flanged between points adjacent to said posts, said flange gradually sloping downward and inward and progressively increasing in width from said points to said posts, said flange being horizontal and of uniform width from post to post, said horizontal portion of said flange being adapted to serve as a threshold plate for said floor, and means securing said posts to said sill.

3. In a railway house car having a floor, spaced door posts, a side sill, said sill having an upstanding leg extending substantially from end to end of said car, said leg from post to post being turned downwardly and inwardly to provide a threshold plate for said floor, and means securing said posts to said sill.

4. In a railway house car having a floor, spaced door posts, a side sill having an upstanding leg and an inwardly directed leg extending substantially from end to end of said car, a reinforcement for said sill having an inwardly directed leg, means securing said inwardly directed legs together, said upstanding leg from post to post being turned downwardly and inwardly to provide a threshold plate for said floor overlying said inwardly directed leg of said sill, openings in said threshold plate to permit securement of said inwardly directed legs by the means therefor, and means securing said posts to said sill.

5. In a railway house car having a floor, spaced door posts, a side sill having an upstanding leg and an inwardly directed leg extending substantially from end to end of said car, a reinforcement for said sill having an inwardly directed leg, means securing said inwardly directed legs together, said upstanding leg from said posts to the ends of said car extending above said floor, said upstanding leg being flanged between points adjacent to said posts, said flanges gradually sloping downwardly and inwardly from said points to said posts and being horizontal from post to post to provide a threshold plate for said floor overlying said inwardly directed leg of said sill, openings in said threshold plate to permit securement of said inwardly directed legs by the means therefor, and means securing said posts to said sill.

6. A side sill comprising an intermediate channel-shaped portion, end portions each embodying an upstanding leg extending above said channel-shaped portion, and portions sloping downwardly from said upstanding legs to said channel-shaped portion.

7. A side sill comprising a horizontal leg and a vertical leg, said vertical leg being gradually turned downwardly toward said horizontal leg at spaced points to provide sloping flanges and a horizontal flange connecting said sloping flanges, said horizontal flange being spaced from said horizontal leg.

8. A side sill comprising a horizontal leg and a vertical leg, said vertical leg being gradually turned downwardly toward said horizontal leg at spaced points to provide sloping flanges and a horizontal flange connecting said sloping flanges, said horizontal flange being spaced from said horizontal leg and being formed with a plurality of openings therein, for the purpose set forth.

9. A side sill comprising an intermediate channel-shaped portion having upper and lower flanges, end portions each embodying an upstanding leg extending above said channel-shaped portion, said upstanding legs being gradually turned downwardly to form a sloping flange of progressively increasing width, said flange being integral with the upper flange of said channel-shaped portion.

10. In a railway house car having a floor, spaced door posts, a side sill, said sill having an upstanding leg extending substantially from end to end of said car, said leg being flanged downwardly between a point adjacent to one of said posts and a point adjacent to the other of said posts, said flange gradually sloping downward from said points substantially to said posts and being horizontal substantially from post to post, and means securing said posts to said sill.

11. A side sill comprising a horizontal leg and a vertical leg, said vertical leg being gradually turned downwardly at spaced points to provide sloping flanges and a horizontal flange connecting said sloping flanges, said horizontal flange lying in a plane above said horizontal leg.

12. A side sill comprising an intermediate portion having upper and lower horizontal flanges and a vertical web, end portions each embodying an upstanding leg extending above said intermediate portion, said upstanding leg of each end portion being gradually turned downwardly and forming a sloping flange of progressively increasing width, said flange being integral with the upper flange of said intermediate portion.

FRANK DITCHFIELD.

REFERENCES CITED

The following references are of record in the file of this patent:

UNITED STATES PATENTS

| Number | Name | Date |
|---|---|---|
| 2,207,361 | Thompson | July 9, 1940 |
| 842,873 | Dodds | Feb. 5, 1907 |